(12) United States Patent
Baldovino et al.

(10) Patent No.: US 11,975,599 B2
(45) Date of Patent: May 7, 2024

(54) SENSOR ASSEMBLY WITH DEFLECTOR

(71) Applicant: Ford Global Technologies, LLC, Dearborn, MI (US)

(72) Inventors: Segundo Baldovino, Novi, MI (US); Rashaun Phinisee, Ypsilanti, MI (US); Michael Robertson, Jr., Garden City, MI (US); Vahan Kazandjian, Warrington, PA (US); Venkatesh Krishnan, Canton, MI (US); Navvab Khajehosseini, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 261 days.

(21) Appl. No.: 17/545,426

(22) Filed: Dec. 8, 2021

(65) Prior Publication Data
US 2023/0173899 A1    Jun. 8, 2023

(51) Int. Cl.
*B60J 7/22*      (2006.01)
*G01S 7/481*    (2006.01)
*G01S 17/931*  (2020.01)

(52) U.S. Cl.
CPC ............ *B60J 7/226* (2013.01); *G01S 7/4813* (2013.01); *G01S 17/931* (2020.01)

(58) Field of Classification Search
CPC ..... B60J 7/22; B60J 7/223; B60J 7/226; B60J 1/20; B60J 1/2002; B60J 1/2005; B60J 1/2008; B60J 10/72; G01S 17/931; G01S 7/4813; G01S 7/4817
See application file for complete search history.

(56) References Cited

U.S. PATENT DOCUMENTS

| | | | |
|---|---|---|---|
| 7,009,141 B1 * | 3/2006 | Wool ................. | B23K 26/0096 219/121.73 |
| 10,338,199 B1 * | 7/2019 | McWhirter .......... | G01S 7/4816 |
| 10,928,225 B1 | 2/2021 | Krishnan et al. | |
| 2016/0274222 A1 * | 9/2016 | Yeun ..................... | G01S 7/4817 |
| 2018/0361997 A1 * | 12/2018 | Schmidt ................ | G02B 27/00 |
| 2019/0008345 A1 * | 1/2019 | Schmidt .................... | A47L 9/08 |
| 2021/0003669 A1 | 1/2021 | Diehi et al. | |
| 2021/0170995 A1 | 6/2021 | Zhuang et al. | |
| 2021/0339685 A1 * | 11/2021 | Adams .................... | H04N 23/57 |
| 2021/0339699 A1 * | 11/2021 | Adams .................... | B60R 21/34 |
| 2021/0339710 A1 * | 11/2021 | Adams .................. | G01S 15/931 |
| 2021/0341583 A1 * | 11/2021 | Adams ...................... | B60S 1/54 |

FOREIGN PATENT DOCUMENTS

DE       102013006686 A1     10/2014

* cited by examiner

*Primary Examiner* — Orlando Bousono
(74) *Attorney, Agent, or Firm* — Frank A. MacKenzie; Bejin Bieneman PLC

(57) ABSTRACT

An assembly includes a housing. The assembly includes a sensor supported by the housing. The assembly includes a shell enclosing the sensor and rotatable relative to the housing in a first direction, the shell defining a window. The assembly includes a deflector extending radially outward from the shell at a leading edge of the window.

20 Claims, 6 Drawing Sheets

SENSOR ASSEMBLY WITH DEFLECTOR

BACKGROUND

Vehicles can include a variety of sensors. Some sensors detect internal states of the vehicle, for example, wheel speed, wheel orientation, and engine and transmission values. Some sensors detect the position or orientation of the vehicle, for example, global positioning system (GPS) sensors; accelerometers such as piezo-electric or microelectro-mechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back.

DETAILED DESCRIPTION

Figure 1:
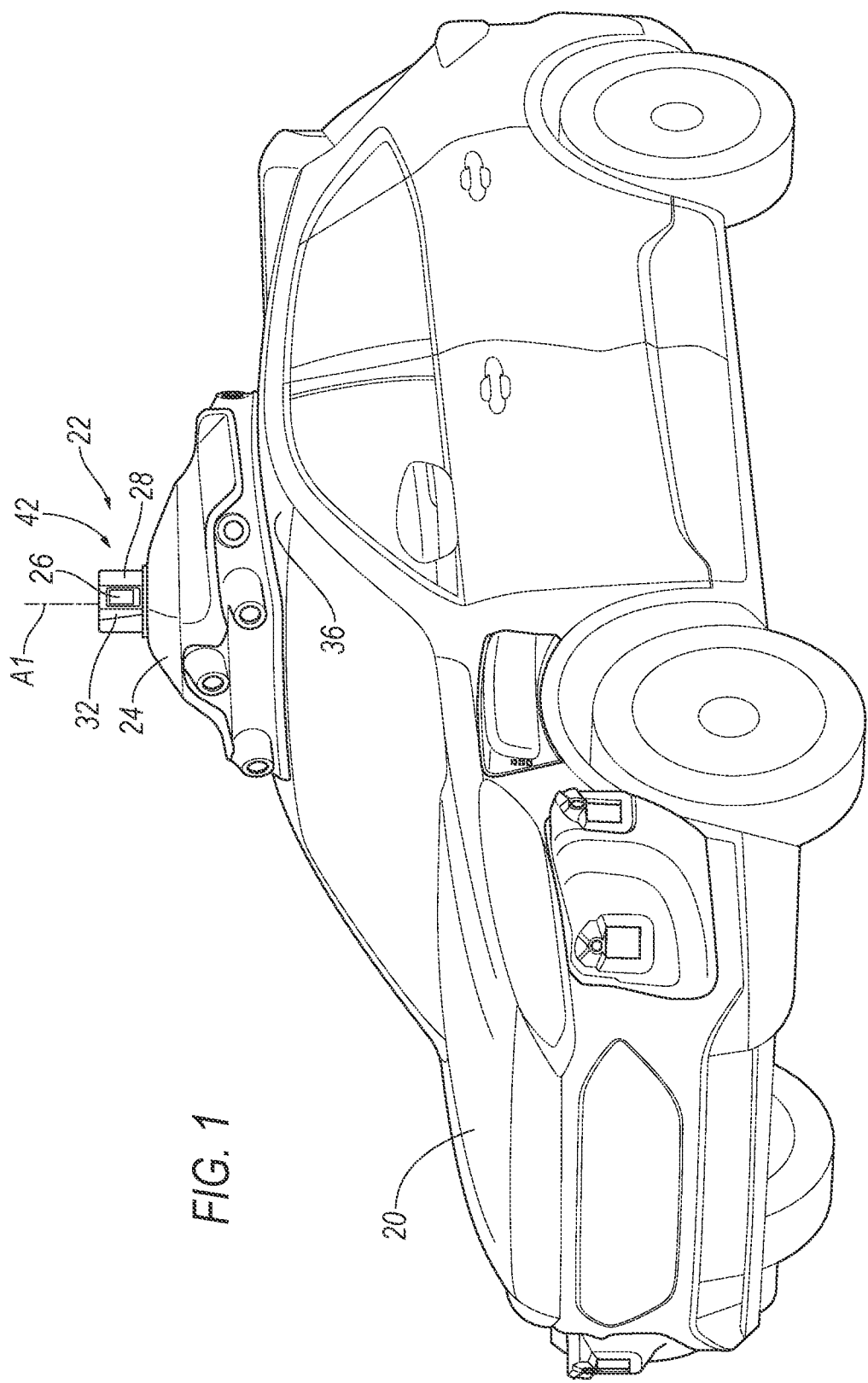
FIG. 1 is a perspective view of an example vehicle with a sensor assembly.

An assembly includes a housing. The assembly includes a sensor supported by the housing. The assembly includes a shell enclosing the sensor and rotatable relative to the housing in a first direction, the shell defining a window. The assembly includes a deflector extending radially outward from the shell at a leading edge of the window.

The shell may be rotatable in the first direction about a first axis and the deflector may be elongated along a second axis transverse to the first axis.

The deflector may be elongated from a first distal end to a second distal end opposite the first distal end, the first distal end forward of the second distal end relative to the first direction.

The first distal end may be above the second distal end.

The assembly may include a vent radially inward of the deflector at the leading edge, the vent facing across the window.

The shell and the deflector may be unitary.

The shell may include an outer surface and the deflector may include a front surface, the outer surface continuous with the front surface.

The deflector may extend radially outward to a distal edge.

The shell may include an outer surface and the deflector may include a front surface extending from the outer surface to the distal edge.

The front surface may define a channel extending along an elongation of the deflector.

The front surface may include a plurality of grooves extending along an elongation of the deflector.

The front surface may be concave and define a channel extending along an elongation of the deflector.

The shell may be rotatable in the first direction about a first axis, and the deflector and the channel may be elongated along a second axis transverse to the first axis.

The deflector may include a rear surface opposite the front surface along the distal edge, the front surface extending rearward from the distal edge relative to the first direction.

The deflector may include a rear surface opposite the front surface along the distal edge and a cusp may be defined at the distal edge by the front surface and the rear surface.

The front surface and the rear surface may define an acute angle at the cusp.

The assembly of claim 1, further comprising a motor operatively coupled to the shell, the motor operable to rotate the shell in the first direction.

The motor may be operable to rotate the shell at 600 rotations per minute.

The housing may include a gutter positioned under the deflector.

The sensor may be a LIDAR sensor.

With reference to the Figures, wherein like numerals indicate like parts throughout the several views, a vehicle 20 supporting a sensor assembly 22 is shown. The sensor assembly 22 includes a housing 24 and a sensor 26 supported by the housing 24. The sensor assembly 22 includes a shell 28 enclosing the sensor 26 and rotatable relative to the housing 24 in a first direction DL. The shell 28 defines a window 30. The sensor assembly 22 includes a deflector 32 extending radially outward from the shell 28 at a leading edge 34 of the window 30. The deflector 32 may help maintain a clear field of view through the window 30 for the sensor 26, e.g., when the shell 28 is rotated in the first direction D1.

With reference to FIG. 1, the vehicle 20 may be any passenger or commercial automobile such as a car, a truck, a sport utility vehicle, a crossover, a van, a minivan, a taxi, a bus, etc. The vehicle 20 may be an autonomous vehicle. A computer can be programmed to operate the vehicle 20 independently of the intervention of a human operator, completely or to a lesser degree. The computer may be programmed to operate a propulsion, brake system, steering system, and/or other vehicle 20 systems based in part of data received from the sensor assembly 22. For the purposes of this disclosure, autonomous operation means the computer controls the propulsion, brake system, and steering system without input from a human operator; semi-autonomous operation means the computer controls one or two of the propulsion, brake system, and steering system and a human operator controls the remainder; and nonautonomous operation means a human operator controls the propulsion, brake system, and steering system.

The vehicle 20 includes a body. The vehicle 20 may be of a unibody construction, in which a frame and the body of the vehicle 20 are a single component. The vehicle 20 may, alternatively, be of a body-on-frame construction, in which the frame supports the body that is a separate component from the frame. The frame and body may be formed of any suitable material, for example, steel, aluminum, etc. The body includes body panels partially defining an exterior of the vehicle 20. The body panels may present a class-A surface, e.g., a finished surface exposed to view by a customer and free of unaesthetic blemishes and defects. The body panels include, e.g., a roof 36, etc.

Figure 2:
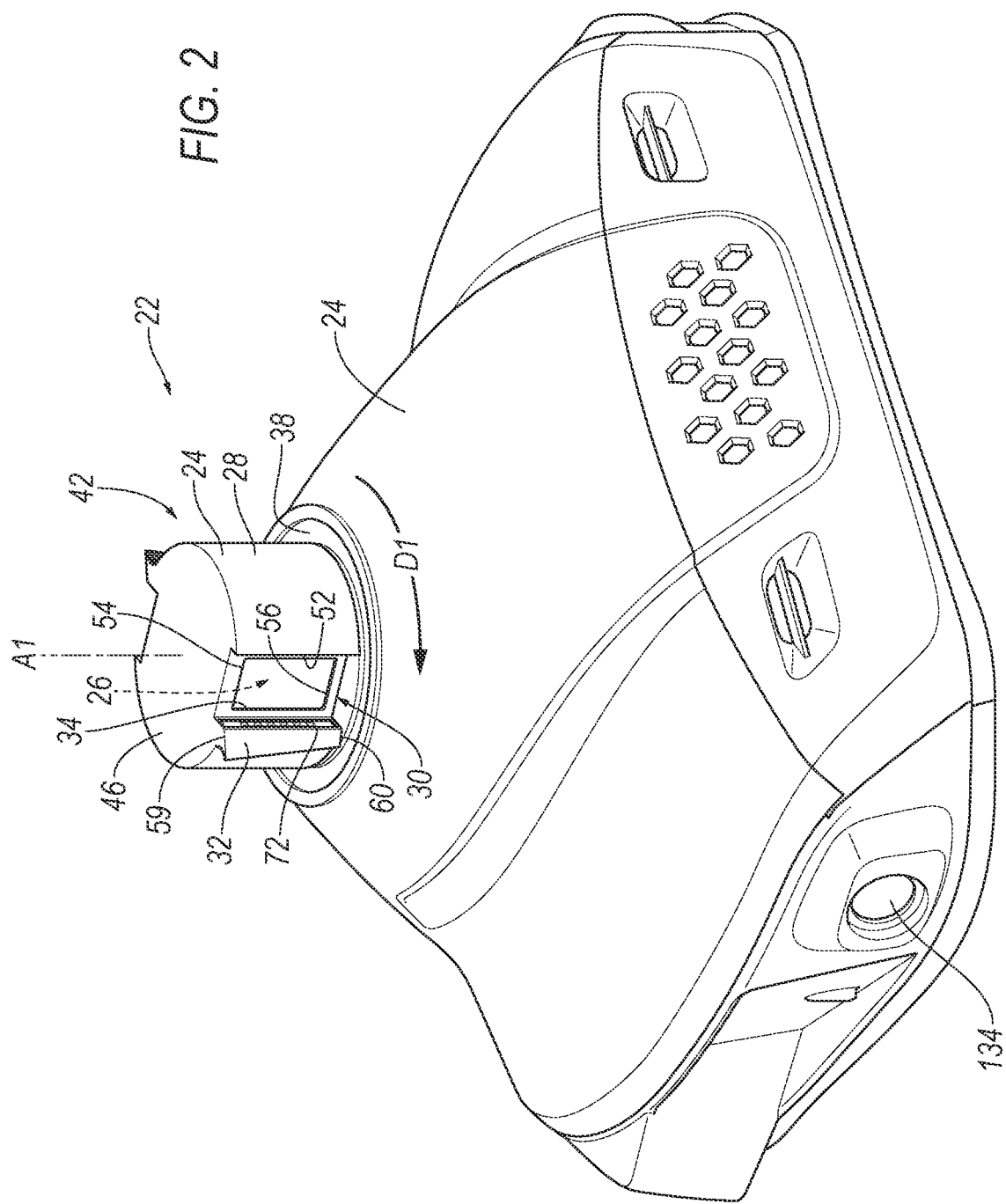
FIG. 2 is a rear perspective view of the sensor assembly.

The sensor assembly 22 includes the housing 24, which is attachable to the vehicle 20, e.g., to one of the body panels of the vehicle 20, e.g., the roof 36. For example, the housing 24 may be shaped to be attachable to the roof 36, e.g., may have a shape matching a contour of the roof 36. The housing 24 may be attached to the roof 36, which can provide the sensor 26 with an unobstructed field of view of an area around the vehicle 20. The housing 24 may be formed of, e.g., plastic or metal. The housing 24 can include a gutter 38 positioned under the deflector 32, as shown in FIG. 2. The gutter 38 may receive water, e.g., from the shell 28, and direct such water away from an aperture of the housing 24. The gutter 38 may surround the sensor 26. For example, the gutter 38 may circumferentially surround the aperture.

With continued reference to FIG. 2, a sensor unit 42 including the sensor 26 and the shell 28 is supported by the housing 24. The sensor unit 42 can be disposed on top of the housing 24 at a highest point of the housing 24. The housing 24 may include the aperture through which the sensor unit 42 passes. The aperture may round, e.g., having a circular or slightly elliptical shape. The aperture is centered on a sensor axis A1. The aperture of the housing 24 may be a highest point of the housing 24.

Figure 3:
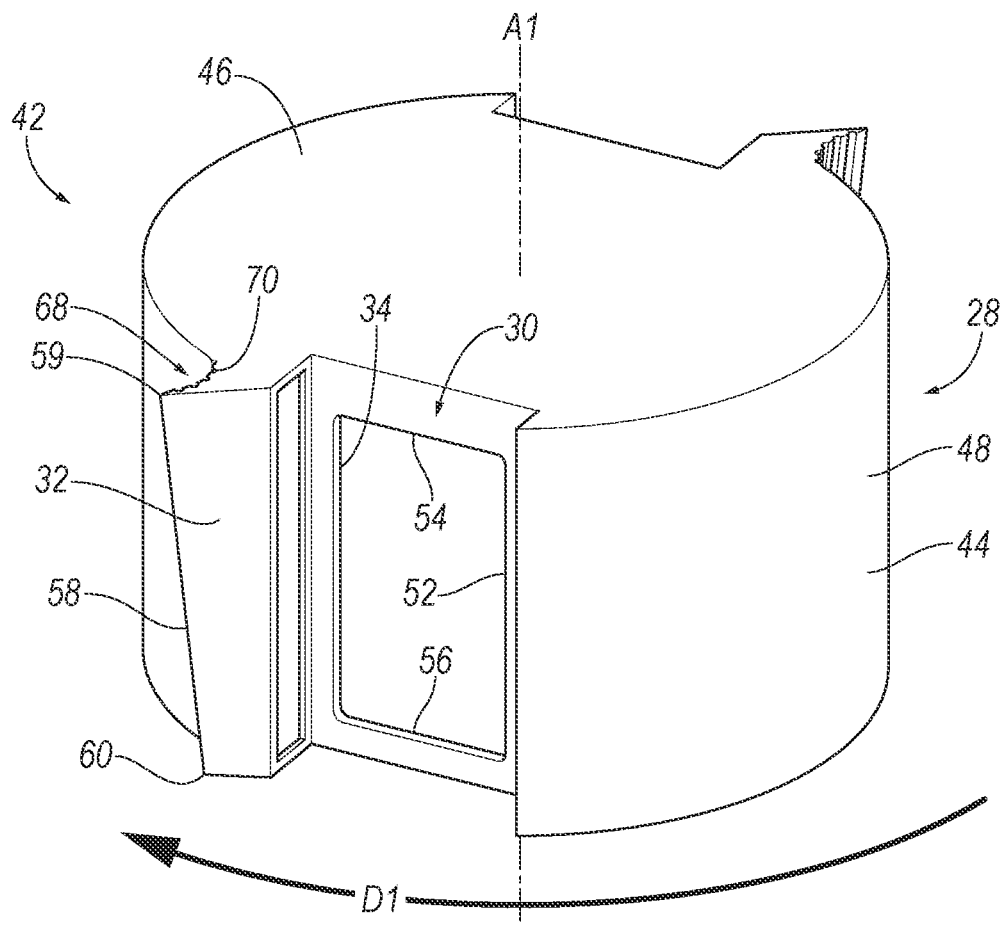
FIG. 3 is an exploded perspective view of a sensor unit of the sensor assembly.
Figure 3:
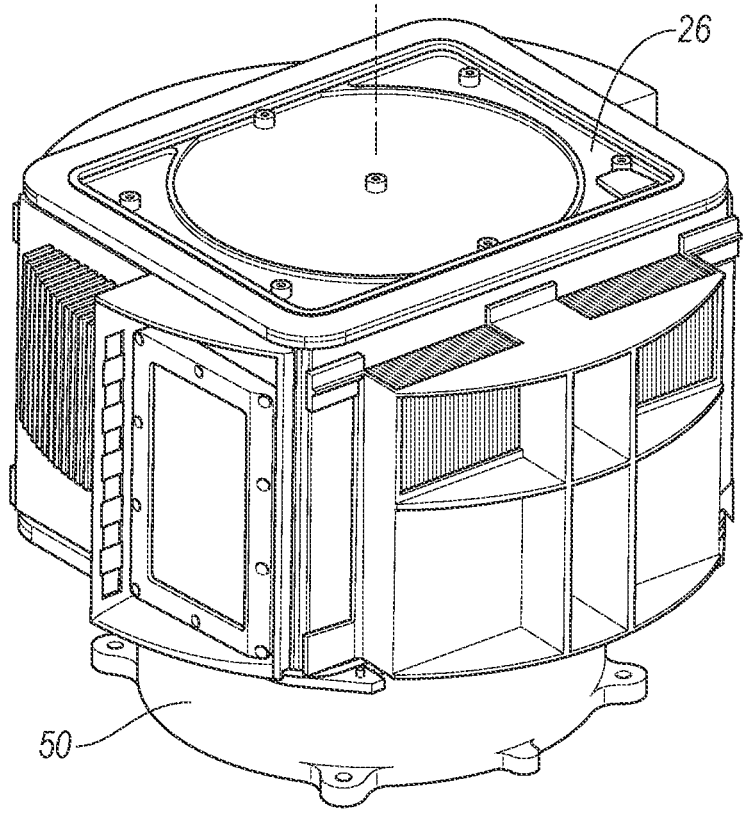

With reference to FIG. 3, the sensor unit 42 includes a base 50, a motor (not shown), the sensor 26, and the shell 28. The shell 28 encloses the sensor 26, e.g., protecting the sensor 26 from rain, debris, etc. The shell 28 may include a generally cylindrical panel 44 surrounding the sensor 26 and a top panel 46 above the sensor 26 and connected at a perimeter to the generally cylindrical panel 44. The generally cylindrical panel 44 of the shell 28 includes an outer surface 48. The outer surface 48 is opposite the sensor 26, e.g., the outer surface 48 may face radially away from the sensor 26 relative to the sensor axis A1. The base 50 is attached to and fixed relative to the housing 24. The motor is attached to and fixed relative to the base 50.

The shell 28 and the sensor 26 are rotatably coupled to the base 50 to rotate about the sensor axis A1 relative to the housing 24. The motor is operatively coupled to the shell 28 and the sensor 26 to rotate the shell 28 and the sensor 26 relative to the housing 24 in the first direction D1. For example, the motor may be coupled to the shell 28 and the sensor 26 via gears, belts, pullies, or any suitable structure. The motor can be any suitable type for rotating the shell 28, e.g., an electric motor. For example, the motor can include a stator (not shown) fixed relative to the base 50 and a rotor (not shown) rotatable by the stator around the sensor axis A1 and operatively coupled to transfer torque to the shell 28 and the sensor 26. The motor may be operable to rotate the shell 28 at least at 600 rotations per minute (rpm). For example, the stator, rotor, voltage provided to the motor, gears, belts, pullies, etc., may be selected such that the rotational movement and torque generated by the motor rotates the shell 28 at least at 600 rpm.

Figure 4:
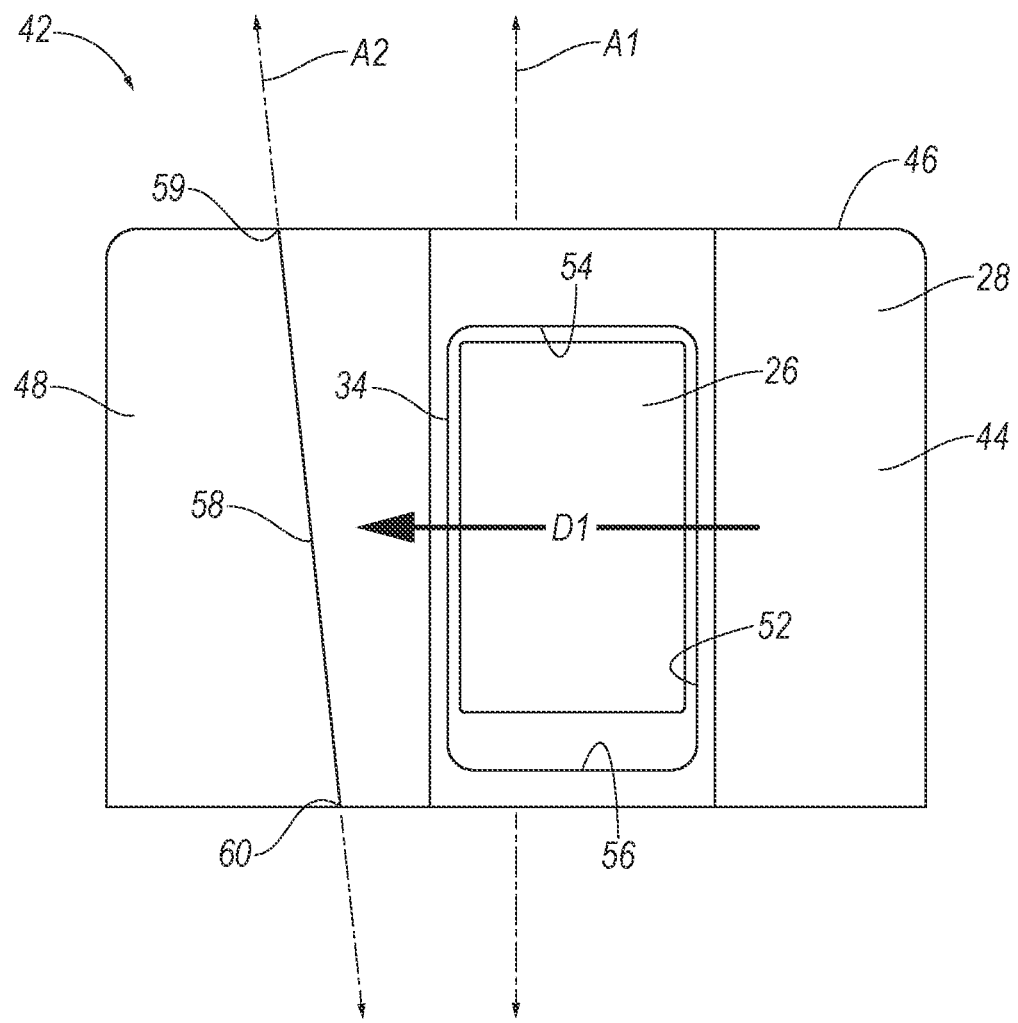
FIG. 4 is a side view of the sensor unit of the sensor assembly.
Figure 5:
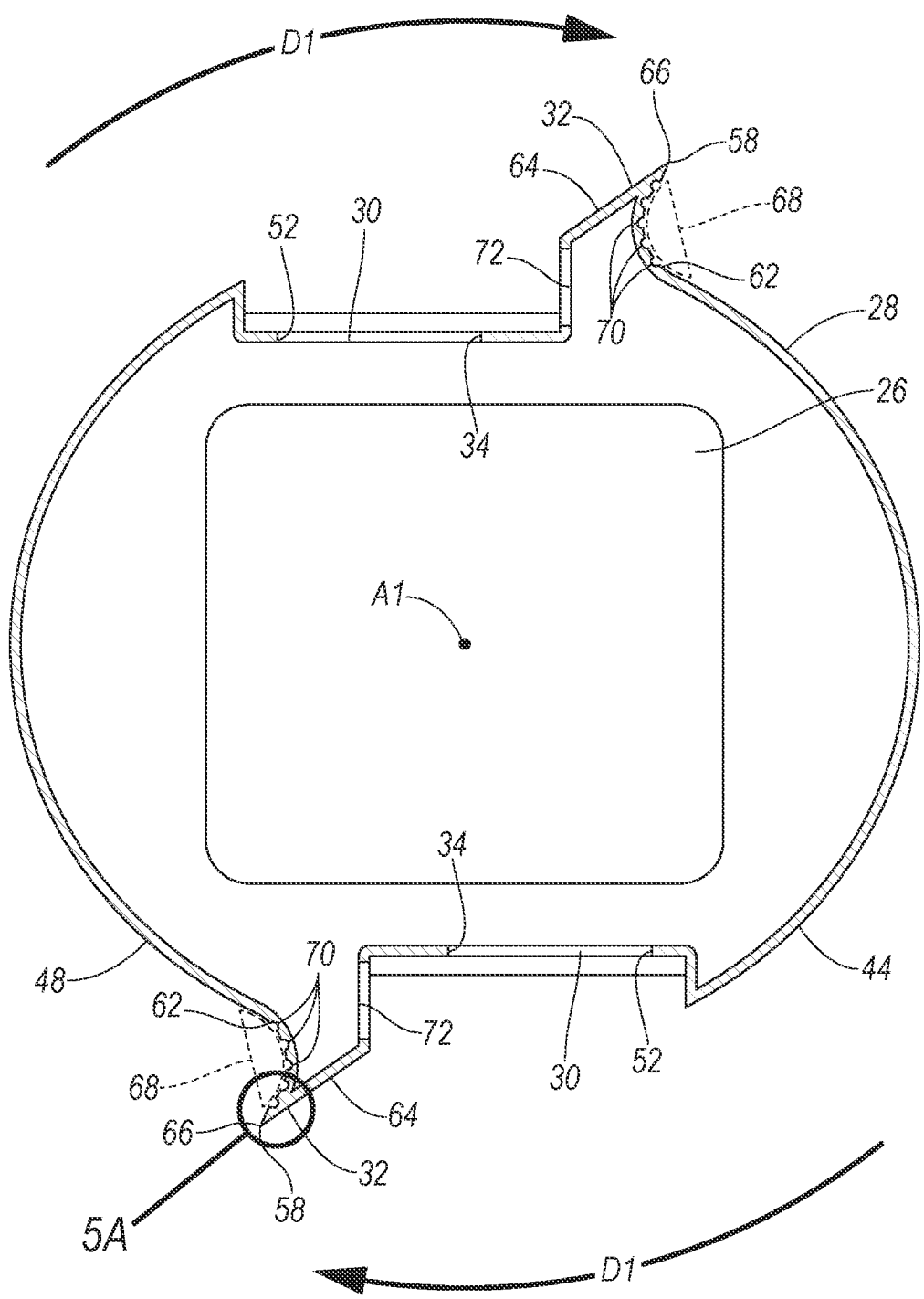
FIG. 5 is a top cross-sectional view of the sensor unit.
Figure 5A:
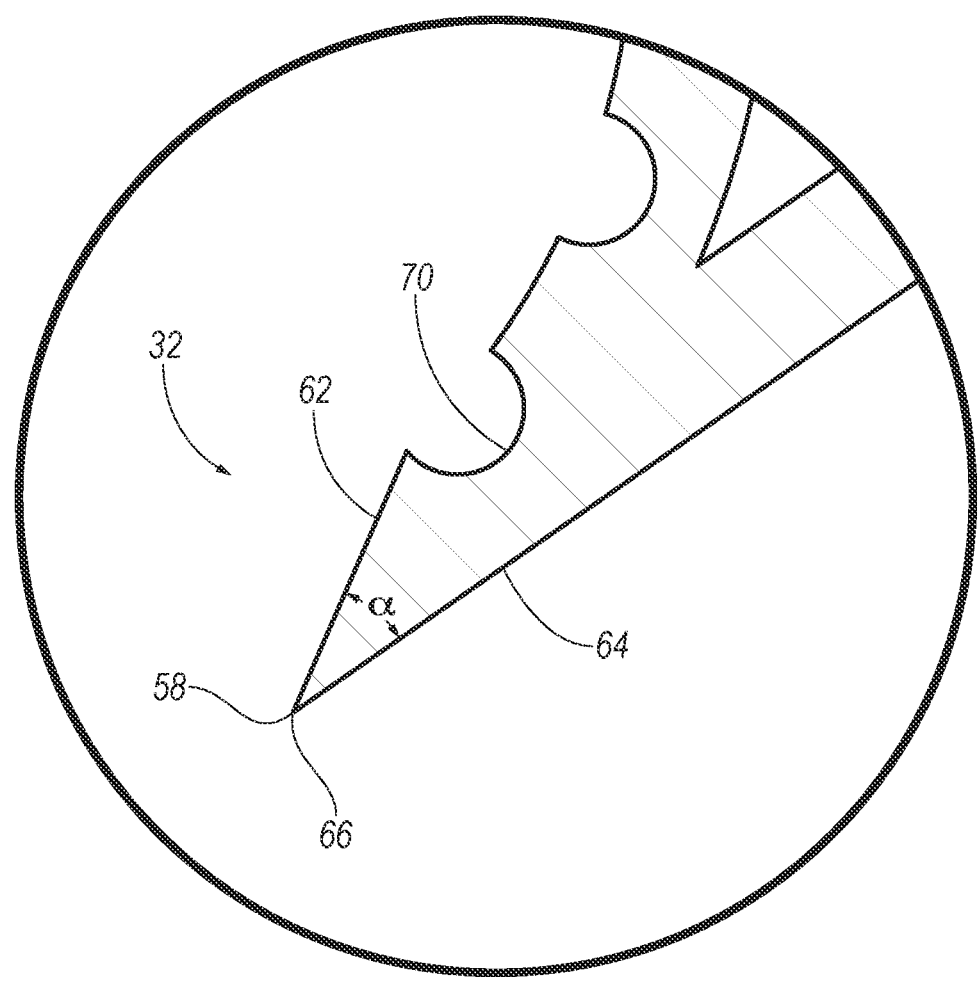
FIG. 5A is an enlarged portion of the top cross-sectional view of FIG. 5.

With reference to FIGS. 3-5, the shell 28 defines one or more windows 30 that permit detection, e.g., of light by the sensor 26, through the shell 28. The windows 30 may be open, e.g., permitting air flow therethrough. The windows 30 can have a rectangular, or any other suitable, shape. The leading edge 34 of the window 30 is relative to the first direction D1, i.e., the leading edge 34 is a forward most edge of the window 30 in the first direction DL. The leading edge 34 may be at forward-most portion of a perimeter of the window 30 relative to the first direction D1. The leading edge 34 may be elongated parallel to the sensor axis A1. The leading edge 34 may be opposite of a trailing edge 52 of the window 30. A top edge 54 and a bottom edge 56 of the window 30 may extend from the leading edge 34 to the trailing edge 52. The window 30 maybe be recessed radially inward of the deflector 32 and the outer surface 48 of the cylindrical panel 44, e.g., relative to the sensor axis A1.

The sensor 26 may be designed to detect features of the outside world; for example, the sensor 26 may be a radar sensor, a scanning laser range finder, a light detection and ranging LIDAR device, or an image processing sensor such as a camera. In particular, the sensor 26 may be a LIDAR device, e.g., a scanning LIDAR device. A LIDAR device detects distances to objects by emitting laser pulses at a particular wavelength and measuring the time of flight for the pulse to travel to the object and back. The sensor 26 has the field of view through the window 30. The field of view encompasses a region from which the sensor 26 receives input. As the sensor 26 and the shell 28 rotates, the field of view can encompass a horizontal 360 degrees around the vehicle 20.

The deflector 32 deflects air coming from forward of the window 30 radially outward relative to the sensor axis A1, e.g., to maintain clarity of the field of view of the sensor 26. The deflector 32 may deflect air and debris radially away from the sensor 26 at the leading edge 34 of the window 30 and/or generate a turbulent air zone radially in front of the window 30. The deflector 32 extends radially outward from the shell 28 relative to the sensor axis A1, e.g., to a distal edge 58. The distal edge 58 is a most radially outward portion of the deflector 32. The deflector 32 may be at the leading edge 34 of the window 30. For example, the deflector 32 may be close enough to the window 30 to deflect air and debris away from the window 30 when the shell 28 is rotated by the motor. The deflector 32 may be supported by, e.g., fixed to, the shell 28. The deflector 32 and the shell 28 may be unitary. Unitary means a single, uniform piece of material with no seams, joints, fasteners, or adhesives holding it together, i.e., formed together simultaneously as a single continuous unit, e.g., by machining from a unitary blank, molding, forging, casting, etc. Non-unitary components, in contrast, are formed separately and subsequently assembled, e.g., by threaded engagement, welding, etc.

The deflector 32 is elongated along a deflector axis A2, e.g., from a first distal end 59 to a second distal end 60 opposite the first distal end 59, as shown in FIG. 4. The distal edge 58 may extend along the deflector axis A2 from the first distal end 59 to the second distal end 60. The deflector axis A2 is transverse, i.e., not parallel, to the sensor axis A1. The first distal end 59 may be above the second distal end 60, the second distal end 60 between the first distal end 59 and the housing 24 along the sensor axis A1. The first distal end 59 may be forward of the second distal end 60 relative to the first direction D1. For example, a slope of the deflector 32 along the deflector axis A2 may be downward and rearward relative to the first direction D1. The slope of the deflector 32 combined with rotation of the shell 28 in the first direction D1 may urge a liquid droplet, e.g., of rain, on the outer surface 48 of the shell 28 downward toward the second distal end 60.

The deflector 32 may include a front surface 62 and a rear surface 64, e.g., opposite the front surface 62 along the distal edge 58. The front surface 62 is forward of the rear surface 64 relative to the first direction D1. The front surface 62 may extend, e.g., outward and rearward, from the outer surface 48 to the distal edge 58. The outer surface 48 may be continuous with the front surface 62. In other words, the outer surface 48 and the front surface 62 may uninterruptedly extend from each other. The rear surface 64 may extend from the distal edge 58 toward the window 30. For example, the rear surface 64 may extend, e.g., rearward and inward, from the distal edge 58 to the leading edge 34 of the window 30. The rear surface 64 may extend continuously from the distal edge 58 to the leading edge 34. A cusp 66 may by defined at the distal edge 58 by the front surface 62 and the rear surface 64, e.g., as shown in FIG. 5. In other words, the front surface 62 and the rear surface 64 may meet at a pointed end on the distal edge 58. The front surface 62 and the rear surface 66 nay define an angle α at the cusp 66. The angle α may be acute, i.e., less than 90 degrees.

With continued reference to FIG. 5, the front surface 62 may be concave. For example, the front surface 62 may extend rearward from the outer surface 48 and curve radially outward along such extension. The front surface 62 defines a channel 68 extending along an elongation of the deflector 32. The channel 68 may be partially enclosed by the front surface 62 and have an open top between the outer surface 48 and the distal edge 58. For example, the channel 68 may be partially enclosed by the concavity of the front surface 62. The channel 68 may be elongated along the deflector axis A2 and extend form the first distal end 59 to the second distal end 60. The front surface 62 can include a plurality of grooves 70 extending along the elongation of the deflector 32. The grooves 70 may extend from the first distal end 59 to the second distal end 60. The grooves 70 may direct water or other debris downward, e.g., along the channel 68. The grooves 70 may be spaced from the outer surface 48 and each other, e.g., in the first direction D1.

The assembly, e.g., the shell 28, can include one or more vents 72 facing across the windows 30. The vents 72 aid in maintaining a clear field of view of the sensor 26. In other words, the vents 72 may be positioned and oriented such that air flow out of the vents 72 travels across the windows 30 and may remove water or other debris therefrom. The vents 72 may be at the leading edge 34 of the window 30 and air flow from the vents 72 may be directed toward the trailing edge 52. The vents 72 may be radially inward of the deflector 32 at the leading edge 34, e.g., relative to the sensor axis A1 and as shown in FIG. 5.

During operation of the vehicle 20 the motor may rotate shell 28 relative to the housing 24. Water and other debris that land on the shell 28 may be urged along the outer surface 48 to the front surface 62, along the front surface 62 to the distal edge 58, and away from the shell 28 at the distal edge 58, e.g., via normal force from air resistance and/or centrifugal force. The water and other debris may also be urged down the grooves 70 to the gutter 38, e.g., via gravitational force. Removal of water and debris from the shell 28 via the distal edge 58 or the gutter 38 aids in maintaining a clear field of view of the sensor 26.

The disclosure has been described in an illustrative manner, and it is to be understood that the terminology which has been used is intended to be in the nature of words of description rather than of limitation. The adjectives "first," "second," "third," and "fourth" are used throughout this document as identifiers and are not intended to signify importance, order, or quantity. Many modifications and variations of the present disclosure are possible in light of the above teachings, and the disclosure may be practiced otherwise than as specifically described.

The invention claimed is:

1. An assembly, comprising:
a housing;
a sensor supported by the housing;
a shell enclosing the sensor and rotatable relative to the housing in a first direction, the shell defining a window; and
a deflector extending radially outward from the shell at a leading edge of the window.

2. The assembly of claim 1, wherein the shell is rotatable in the first direction about a first axis and the deflector is elongated along a second axis transverse to the first axis.

3. The assembly of claim 1, wherein the deflector is elongated from a first distal end to a second distal end opposite the first distal end, the first distal end forward of the second distal end relative to the first direction.

4. The assembly of claim 3, wherein the first distal end is above the second distal end.

5. The assembly of claim 1, further comprising a vent radially inward of the deflector at the leading edge, the vent facing across the window.

6. The assembly of claim 1, wherein the shell and the deflector are unitary.

7. The assembly of claim 1, wherein the shell includes an outer surface and the deflector includes a front surface, the outer surface continuous with the front surface.

8. The assembly of claim 1, wherein the deflector extends radially outward to a distal edge.

9. The assembly of claim 8, wherein the shell includes an outer surface and the deflector includes a front surface extending from the outer surface to the distal edge.

10. The assembly of claim 9, wherein the front surface defines a channel extending along an elongation of the deflector.

11. The assembly of claim 10, wherein the front surface includes a plurality of grooves extending along the elongation of the deflector.

12. The assembly of claim 9, wherein the front surface is concave and defines a channel extending along an elongation of the deflector.

13. The assembly of claim 12, wherein the shell is rotatable in the first direction about a first axis, and the deflector and the channel are elongated along a second axis transverse to the first axis.

14. The assembly of claim 9, wherein the deflector includes a rear surface opposite the front surface along the distal edge, the front surface extending rearward from the distal edge relative to the first direction.

15. The assembly of claim 9, wherein the deflector includes a rear surface opposite the front surface along the distal edge and a cusp is defined at the distal edge by the front surface and the rear surface.

16. The assembly of claim 15, wherein the front surface and the rear surface define an acute angle at the cusp.

17. The assembly of claim 1, further comprising a motor operatively coupled to the shell, the motor operable to rotate the shell in the first direction.

18. The assembly of claim 17, wherein the motor is operable to rotate the shell at 600 rotations per minute.

19. The assembly of claim 1, wherein the housing includes a gutter positioned under the deflector.

20. The assembly of claim 1, wherein the sensor is a LIDAR sensor.

* * * * *